United States Patent
Kato et al.

(10) Patent No.: US 7,120,260 B2
(45) Date of Patent: Oct. 10, 2006

(54) JACK CIRCUIT AND PORTABLE TYPE ELECTRONIC APPARATUS AND TELEPHONE SET USING THE SAME

(75) Inventors: Takenori Kato, Kyoto (JP); Isao Yamamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 853 days.

(21) Appl. No.: 10/157,949

(22) Filed: May 31, 2002

(65) Prior Publication Data

US 2002/0186834 A1   Dec. 12, 2002

(30) Foreign Application Priority Data

Jun. 8, 2001  (JP) .............................. 2001-174130

(51) Int. Cl.
  *H04R 1/10*  (2006.01)
(52) U.S. Cl. ......................................... 381/74; 381/375
(58) Field of Classification Search .................. 381/74, 381/11, 384, 375; 379/428.04, 429; 439/620
  See application file for complete search history.

(56) References Cited

U.S. PATENT DOCUMENTS 6,005,951 A * 12/1999 Grasfield et al. ............. 381/67
6,038,457 A *  3/2000 Barkat ...................... 455/556.1

FOREIGN PATENT DOCUMENTS

JP         9-307990         11/1997

\* cited by examiner

*Primary Examiner*—Curtis Kuntz
*Assistant Examiner*—Alexander Jamal
(74) *Attorney, Agent, or Firm*—Mattingly, Stanger, Malur & Brundidge, P.C.

(57) ABSTRACT

In a jack circuit, in which either positive pole side terminals or negative pole side terminals of connection terminals for a microphone and of connection terminals of an output stage amplifier for outputting to a speaker form a common terminal, the output stage amplifier is an amplifier which jointly operates with a center amplifier performing virtual grounding operation and which operating source voltage is lower than the operating voltage of the microphone, the common terminal is connected to the center amplifier and the other of either the positive pole side terminal or the negative pole side terminal for the microphone is connected to a voltage line which is higher by a level to ensure the operating voltage thereof.

12 Claims, 2 Drawing Sheets

PRIOR ART

JACK CIRCUIT AND PORTABLE TYPE ELECTRONIC APPARATUS AND TELEPHONE SET USING THE SAME

BACKGROUND OF THE INVENTION

1. Field of the Invention

The present invention relates to a jack circuit and a portable type electronic apparatus and a telephone set using the same, and, more specifically, relates to an improvement in a jack circuit suitable for a portable audio apparatus, in which a negative pole side terminal for a stereo system headphone jack and a monaural system microphone jack is utilized as a common terminal, which jack circuit permits to connect the common terminal to an output of a center amplifier performing virtual grounding operation as well as permits to utilize an output circuit being driven by a lower voltage than a driving voltage of a microphone.

2. Background Art

A conventional headphone stereo unit, a conventional portable magnetic tape player such as DCC and DAT and a conventional portable disk player such as MD and CD, and a portable audio apparatus such as IC memory audio player which is recently drawing attention are driven by a dry cell of which number is about from one to two. However, a power source voltage of an audio amplifier circuit is only about 1.2V or 2.4V. Moreover, in many instances the circuit is provided with a stereo function and includes two channels for its output amplifier circuit. For this reason, in order to boost up to its operating source voltage, a DC/DC converter is usually built in.

In particular, with regard to an audio apparatus of this kind which permits recording, a jack for connecting with a headphone and another jack for connecting with a microphone (hereinbelow will be called as a mike) are respectively provided.

Recently, in order to respond to a demand for small sizing and light weighting, JP-A-9-307990(1997) discloses a single hole jack circuit in which a headphone jack and a mike jack are used in common. In the above jack circuit in view of the fact that a monaural input for a mike and stereo outputs for a headphone, a same jack is used for the mike and the headphone and at the time of mike connection the monaural connecting condition is detected, and an input and output change-over is performed by an internal switch circuit. On the other hand, a use of earphone mikes (hand free sets) is now spreading in which conversation can be performed hand free by integrating a mike and a headphone. The earphone mike is a monaural type which is frequently used such as in a telephone exchange office by an operator for responding to phone calls from customers and such earphone mike comprises terminals as shown in FIG. 2(a).

Namely, in a jack circuit 10 in FIG. 2(a) a common terminal 10C at the grounding side serves as a common terminal for a mike 11 and an earphone 12, and an earphone output terminal 10E and a mike input terminal 10M are constituted independently, Thereby, a three wire system cord which comprises two wire cords and a grounding shield line or comprises three wire cords, is used.

Further, numeral 13 is an output stage amplifier and +VDD is a source voltage line.

Still further, recently such as for a portable magnetic tape player, a use of earphone mikes corresponding to stereo system is spreading. In such instance, as shown in FIG. 2(b), a single hole jack circuit 14 provided with two terminals 10R and 10L corresponding to respectively to right and left channels for a headphone use. Thereby, a four wire system cord which comprises three wire cords and a grounding shield line or comprises four wire cords, can be used.

Further, a headphone 15 includes a right channel speaker 15R and a left channel speaker 15L. Numerals 16 and 17 are respectively a right channel output stage amplifier and a left channel output stage amplifier.

What is disclosed in JP-A-9-307990(1997) requires inside thereof a detection circuit and a change-over circuit for performing input and output exchange. For this reason, there was a drawback of increasing circuit scale thereof.

Further, as an output stage amplifier for an earphone (a headphone), it is preferable to use an OCL circuit (or a center amplifier type circuit operating as a virtual ground (the voltage thereof is usually VDD/2)) which unnecessitates a coupling capacitor at the output thereof, in order to improve frequency characteristic in a low frequency band as well as to reduce size and weight of the apparatus concerned. However, with the jack circuit as shown in FIG. 2(b), since a grounding terminal (or a negative pole side terminal) for both terminals for the earphone (headphone) and a grounding terminal (or a negative pole side terminal) for the mike form a common terminal, when the OCL circuit is used, the grounding side of the mike is to be connected to the output of the center amplifier. For this reason, the operating voltage is lowered by the voltage level of the virtual ground, in that by the voltage of VDD/2, thereby, there arises a problem that the mike which is inherently placed at the operating level when the negative side terminal is at the ground potential can not be used. In order to avoid these problems, it is possible to increase the source voltage for the total circuits, however, such measure causes another problem of increasing power consumption of the circuits.

SUMMARY OF THE INVENTION

An object of the present invention is to resolve the above conventional art problems and to provide a jack circuit suitable for a portable audio apparatus, in which a negative pole side terminal for a stereo headphone jack and a monaural microphone jack is utilized as a common terminal, which jack circuit permits to connect the common terminal to an output of a center amplifier performing virtual grounding operation as well as permits to utilize an output circuit being driven by a lower voltage than a driving voltage of a microphone, and a portable type electronic apparatus and a telephone set using the jack circuit.

A jack circuit, a portable type electronic apparatus and a telephone set according to the present invention which achieves the above object is characterized in that either positive pole side terminals or negative pole side terminals of connection terminals for a microphone and of connection terminals of an output stage amplifier for outputting to a speaker form a common terminal, the output stage amplifier is an amplifier which jointly operates with a center amplifier performing virtual grounding operation and which operating source voltage is lower than the operating voltage of the microphone, the common terminal is connected to the center amplifier and the other of either the positive pole side terminal or the negative pole side terminal for the microphone is connected to a voltage line which is higher by a level to ensure the operating voltage thereof.

As has been explained above, according to the present invention, even when the output stage amplifier is used which operates with a lower operating source voltage than the operating voltage of the microphone with reference to the center amplifier performing virtual grounding operation, since the other terminal of the microphone is connected to the voltage line which is higher by a level to ensure the operating voltage thereof, the microphone can surely be operated and the output stage amplifier outputs to the speaker while commonly using the common terminal together with the microphone.

As a result, a jack circuit suitable for a portable type electronic apparatus and a telephone set which includes an output circuit driven by a low voltage below a microphone driving voltage can be easily realized, and the power consumption thereby can be suppressed low.

BRIEF DESCRIPTION OF THE DRAWINGS

FIGS. 2(a) and 2(b) are diagrams for explaining circuits which connect negative pole side terminals of a headphone jack and a monaural mike jack to a common terminal, wherein FIG. 2(a) is an explanatory diagram for the case of monaural system and FIG. 2(b) is an explanatory diagram for the case of stereo system.

DESCRIPTION OF THE PREFERRED EMBODIMENT

Figure 1:
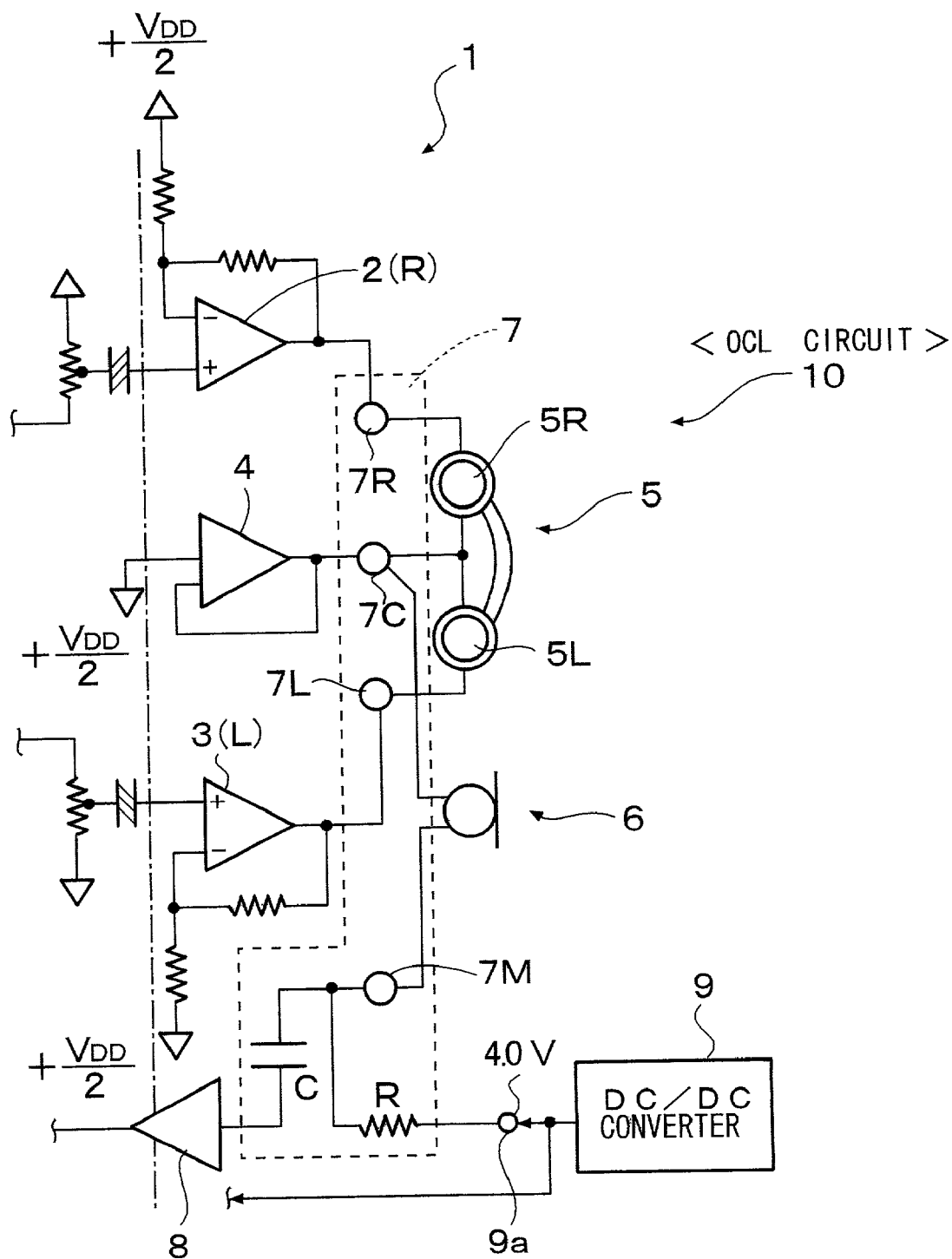
FIG. 1 is a block diagram primarily of a jack circuit for an audio apparatus representing an embodiment to which a jack circuit according to the present invention is applied.
Figure 2A:
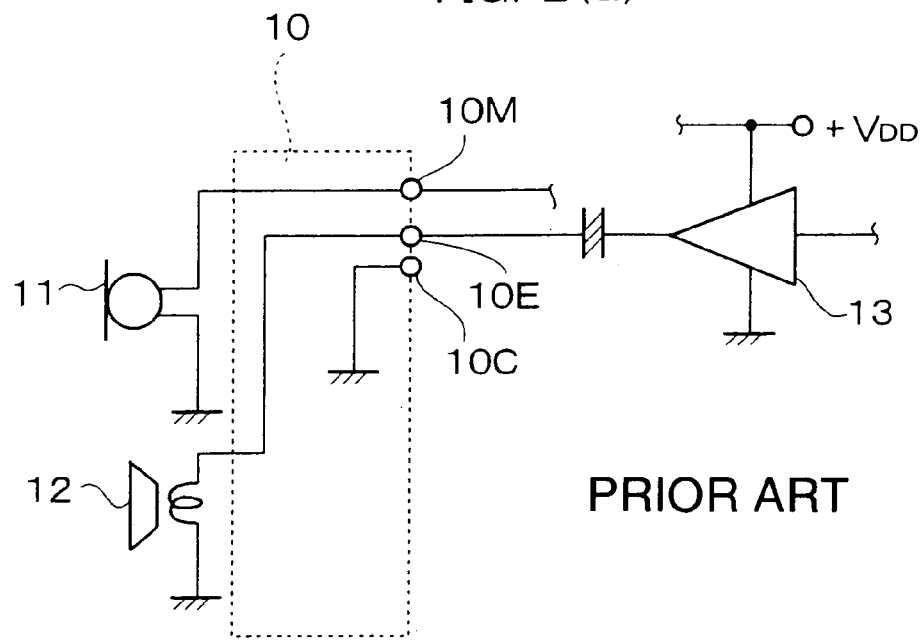
Figure 2B:
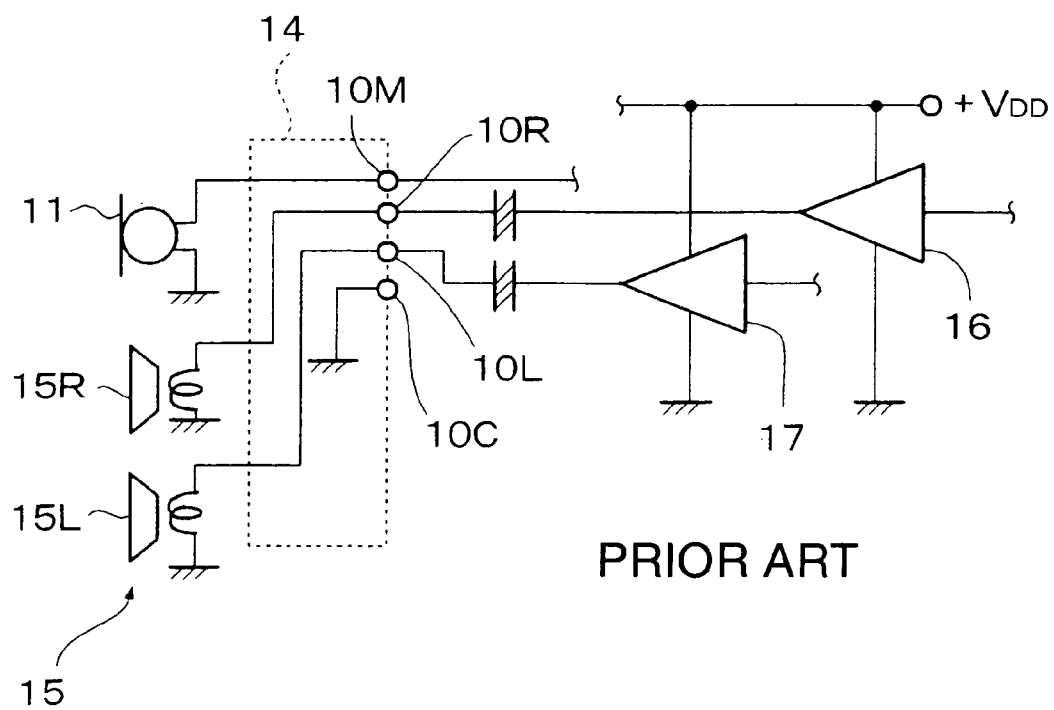

In FIG. 1, numeral 1 is a stereo system output stage circuit in an OCL circuit 10 and the stereo system output stage circuit 10 includes an R (right) channel output stage amplifier 2, a L (left) channel output stage amplifier 3 and a center amplifier 4 performing virtual grounding operation. 5 is a headphone, 6 is a mike, and 7 is a single hole jack circuit which has three positive pole side terminals and one common terminal (negative pole side terminal). In the jack circuit 7, among two wire system connection terminals of the respective R channel output stage amplifier 2 and L channel output stage amplifier 3 the grounding side (negative pole side) terminals form a common terminal and the two positive pole side terminals are connected to the outputs of the respective output stage amplifiers. Further, while using the negative pole side terminal of two wire system connection terminals for the mike 6 as the common terminal in common one positive pole side terminal serves as a mike signal input side.

a plug of four wire system cord, for example, which comprises three wire cords and a grounding shield line and has two headphone side plug terminals, one mike side plug terminal and a common plug terminal, is inserted into the single hole jack circuit 7 via its hole. Stereo two wire cords of the four wire system cord for earphone or headphone are connected to each of the output connection terminals (each of two positive pole side terminals) of the jack circuit 7 and other one wire cord of the four wire system cord for the mike 6 is connected to the input connection terminal (other one positive pole side terminal) of the jack circuit 7. The grounding shield line cord of the four wire system cord is connected to the common connection terminal of the jack circuit 7.

With regard to the headphone 5, a right (R) channel speaker 5R is connected to an output terminal 7R and a common terminal (negative pole side terminal) 7C of the jack circuit 7 via the plug of four wire system cord, and a left (L) channel speaker 5L is connected to an output terminal 7L and the common terminal 7C of the jack circuit 7 via the plug of four wire system cord. Further, the mike 6 is connected to a mike input terminal 7M and the common terminal 7C in the jack circuit 7 via the plug of four wire system cord. The common terminal 7C is then connected to the output of the center amplifier 4.

The output connection terminal (positive pole side terminal) 7R is connected to the output of the output stage amplifier 2 and the output connection terminal (positive pole side terminal) 7L is connected to the output of the output stage amplifier 3.

The mike input connection terminal (positive pole side terminal) 7M is connected to a mike amplifier 8 via a capacitor C in the jack circuit 7, and further connected to a terminal 9a with voltage 4.0V of a DC/DC converter 9 via a resistor R in the jack circuit 7. In the present embodiment, the source voltage +VDD of the OCL circuit 10 is, for example, at 3.0V which is lower than the source voltage of 4.0V of the DC/DC converter 9. Therefore, the voltage level of the center amplifier 4 performing virtual grounding operation is about at 1.5V corresponding to VDD/2.

In thus structured circuit, substantially no current flows through the mike 6, therefore, even when a high resistance is selected for the resistor R, the voltage at the mike 6 assumes 4.0V−1.5V≈2.5V, thereby, an operating voltage for operating the mike 6 normally can be ensured. As a result, a usual four wire system cord which comprises three wire cords and a grounding shield line or comprises four wire cords, can be used.

In the present embodiment, the DC/DC converter 9 is a converter which is usually built-in in a portable type apparatus for boosting up the operating source voltage, and when the operating source voltage is at 3.0V drive (the source voltage of the respective R and L output stage amplifier circuits is at 1.5V drive, half of the operating source voltage), a boosted up voltage to about 4.0V is generally stabilized to about 3.0V via a regulator, therefore, the output voltage of 4.0V from the boosting circuit can be used directly.

In the present embodiment, as has been explained hitherto the audio apparatus has been exemplified, however, the jack circuit according to the present invention is not limited to the audio apparatus. However, the present invention is applied to a circuit in which the drive source voltage of the output stage amplifiers is lower than the mike operating voltage, and is suitable for a small sized portable type electronic apparatus and a telephone set.

Further, in the present embodiment a headphone is exemplified as the speaker, however, the speaker is not limited to the headphone.

Still further, in the present embodiment, the negative pole side (grounding side) terminal forms the common terminal, the positive pole side terminal can form the common terminal. Further, the jack circuit according to the embodiment exemplifies the stereo system, however, the present invention can be, of course, applicable to a monaural system.

The invention claimed is:

1. A jack circuit, in which either positive pole side terminals or negative pole side terminals of connection terminals for a microphone and of connection terminals of an output stage amplifier for outputting to a speaker, form a common terminal, wherein the output stage amplifier is an amplifier which jointly operates with a center amplifier performing virtual grounding operation and an operating source voltage of the output stage amplifier is lower than the operating voltage of the microphone, the common terminal is connected to the center amplifier and the other of either the positive pole side terminal or the negative pole side terminal for the microphone is connected to a voltage line which is higher by a level to ensure the operating voltage thereof.

2. A jack circuit according to claim 1, wherein the voltage which is higher by a level to ensure the operating voltage of the microphone is obtained from a DC/DC converter for boosting up a voltage of a battery via a resistor.

3. A jack circuit according to claim 2, wherein the output stage amplifier is a stereo system output using an OCL circuit including a right channel output stage amplifier and a left channel output stage amplifier, and the other terminal for the microphone is further connected to a mike amplifier via a capacitor.

4. A jack circuit according to claim 1, wherein the negative pole side terminals form the common terminal and one of the positive pole side terminals is connected to the output stage amplifier and the other positive pole side terminal is connected to the microphone.

5. A portable type electronic apparatus with a jack circuit, in which either positive pole side terminals or negative pole side terminals of connection terminals for a microphone and of connection terminals of an output stage amplifier for outputting to a speaker, form a common terminal, the output stage amplifier is an amplifier which jointly operates with a center amplifier performing virtual grounding operation and an operating source voltage of the output stage amplifier is lower than the operating voltage of the microphone, the common terminal is connected to the center amplifier and the other of either the positive pole side terminal or the negative pole side terminal for the microphone is connected to a voltage line which is higher by a level to ensure the operating voltage thereof.

6. A portable type electronic apparatus according to claim 5, wherein the voltage which is higher by a level to ensure the operating voltage of the microphone is obtained from a DC/DC converter for boosting up a voltage of a battery via a resistor.

7. A portable type electronic apparatus according to claim 6, wherein the output stage amplifier is a stereo system output using an OCL circuit including a right channel stage amplifier and a left channel output stage amplifier, and the other terminal for the microphone is further connected to a mike amplifier via a capacitor.

8. A portable type electronic apparatus according to claim 5, wherein the negative pole side terminals form the common terminal and one of the positive pole side terminals is connected to the output stage amplifier and the other positive pole side terminal is connected to the microphone.

9. A telephone set with a jack circuit, in which either positive pole side terminals or negative pole side terminals of connection terminals for a microphone and of connection terminals of an output stage amplifier for outputting to a speaker, form a common terminal, wherein the output stage amplifier is an amplifier which jointly operates with a center amplifier performing virtual grounding operation and an operating source voltage of the output stage amplifier is lower than the operating voltage of the microphone, the common terminal is connected to the center amplifier and the other of either the positive pole side terminal or the negative pole side terminal for the microphone is connected to a voltage line which is higher by a level to ensure the operating voltage thereof.

10. A telephone set according to claim 9, wherein the voltage which is higher by a level to ensure operating voltage of the microphone is obtained from a DC/DC converter for boosting up a voltage of a battery via a resistor.

11. A telephone set according to claim 10, wherein the output stage amplifier is a stereo system output using an OCL circuit including a right channel output stage amplifier and a left channel output stage amplifier, and the other terminal of the microphone is further connected to a mike amplifier via a capacitor.

12. A telephone set according to claim 9, wherein the negative pole side terminals form the common terminal and one of the positive pole side terminals is connected to the output stage amplifier and the other positive pole side terminal is connected to the microphone.

* * * * *